June 12, 1962     J. J. CALLAHAN     3,038,557
POSITIVE PROPORTIONING, OPEN-LINE-INDICATING
LUBRICATING SYSTEM
Original Filed March 21, 1960     2 Sheets-Sheet 1

INVENTOR.
JAMES J. CALLAHAN
BY Ely, Pearne &
Gordon
ATTORNEYS

INVENTOR.
JAMES J. CALLAHAN
BY Ely, Pearne & Gordon
ATTORNEYS

United States Patent Office 3,038,557
Patented June 12, 1962

3,038,557
POSITIVE PROPORTIONING, OPEN-LINE-INDICATING LUBRICATING SYSTEM
James J. Callahan, Mentor, Ohio, assignor to Trabon Engineering Corporation, Solon, Ohio, a corporation of Ohio
Continuation of application Ser. No. 16,286, Mar. 21, 1960. This application Oct. 6, 1960, Ser. No. 61,031
8 Claims. (Cl. 184—7)

This invention relates generally to cyclical fluid distributing systems and components thereof. More particularly the invention relates to centralized cyclical lubricating systems which may employ fluids which are compressible and have shear strength in the direction of flow, as do most greases. The centralized lubricating systems are designed to supply lubricant from a supply source to several stations and to proportion the supply of lubricant between the several stations.

The present invention provides a centralized lubricating system which is capable of signaling trouble in the form of blockage or leakage in one or more or any of the branch lines without the use of auxiliary signaling systems employing electric leads and the like and solely by means of pressure signals transmitted through the lubricating fluid even if such fluid is compressible to a substantial degree and is of such character that it resists in shear the initiation or reversal of flow through conduits.

The invention is not necessarily restricted in all aspects to use in connection with compressible fluids or fluids exhibiting significant static shear strength, but the invention has application to centralized cyclical fluid distributing systems in general and particularly those wherein pressure accumulation effects result from the elastic deformation of conduit walls, curves, elbows and the like.

An object of the invention is to provide a fluid distributing system where supplied fluid is distributed to a number of lines and positively proportioned therebetween and wherein leakage or blockage in one or more or any of the lines is signaled at or near the supply source by pressure signals within the system. The invention contemplates in a broad sense the use of a cyclical type lubricant distributor or distributors. As used herein the term "cyclical distributors" includes distributors of the type shown for example in U.S. Patents Re. 21,236; 2,718,281; 2,792,911; and 2,834,433 in which lubricant is received in a single main inlet and is discharged in endless predetermined sequence through a number of outlets to a number of corresponding branch lines, the intended operation being that input pressure is applied sequentially to one branch line at a time, with the remainder of the branch lines being closed off at their input ends until respective turns arrive in the course of the desired sequence, whereby blockage in any branch line causes pressure to build up in that line until input pressure to the distributor is no longer sufficient to force additional fluid into that line and the distributor therefore becomes blocked because it cannot cycle past the phase or phases in its sequential operation at which there should occur discharge to that particular branch line. The invention contemplates a system organization whereby a lubricant supply means is associated by a supply line with at least one distributor, and branch lines are provided leading from the distributor outlets and leading at their downstream ends to back-pressure imposing means which may simply be the bearing or other element being lubricated or supplied with the fluid at the station supplied by the branch line. The invention further contemplates providing means at an upstream location with respect to one or more or each of the branch lines of one or more or each distributor, which means continuously maintains such branch line or lines open to incoming fluid supplied through the associated distributor only so long as the above-mentioned back pressure is imposed. The organization is such that if either leakage or blockage occurs in such branch line or lines an abnormally high back pressure in the supply line from the supply means of the system will signal trouble.

Suitable means is provided at the vicinity of the fluid supply source (or at other appropriate upstream location such as a main supply line, or a branch line from a primary distributor which branch line is itself the supply line for a secondary or subsidiary distributor) for responding to trouble-signaling pressure rises. This pressure-responsive means may be adapted to trigger automatic shutting down of the system or the pressure-responsive means may trigger signal means calling for manual shutting down of the system or calling for other appropriate action. In any event, the occurrence of either leakage or blockage in one, or more, or any of the several branch lines will signal trouble at or toward the supply end of the system by pressure signals transmitted through the distributed fluid.

The means which continuously maintains the branch line or lines open to incoming fluid only so long as the minimum back pressure obtains therein may comprise one or several pressure-responsive devices located at the input or outlet sides of the distributor unit. These devices may be such as to accomplish automatic resetting following occasions in which there is pressure loss in one or more portions of the system, as during weekend shutdowns of the system. Such pressure-responsive devices may also include telltale means to enable ready location of trouble by identification of the branch lines in which the trouble occurs or at least identification of the group of branch lines in which the trouble occurs.

In circumstances where automatic resetting of the system is not necessary or desirable, the invention also contemplates the provision of pressure-responsive devices which are adapted to be readily manually reset following the occurrence of trouble or after weekend shutdowns or the like.

According to one preferred and novel aspect of the invention such back-pressure imposing means constitutes a special ball check valve or other form of pressure relief valve or the like for imposing a back pressure somewhat higher than that required by the bearing or other element being lubricated or supplied with fluid at the station supplied by the branch line. In an even more specific aspect of the invention which is important to successful operation with the type greases which tend to pack under a ball-check valve and prevent seating thereof, the invention contemplates a back-pressure imposing means in the form of a pressure relief valve which is closed and opened by the telescoping of two mating members rather than by the seating and unseating of a ball check, the arrangement being such that cut-off position occurs before the limiting end position of the valve is reached when it moves in the "close" direction.

In these connections, there are described below and illustrated in the accompanying drawings fluid distributor system means of the type contemplated by the invention.

Figure 1:
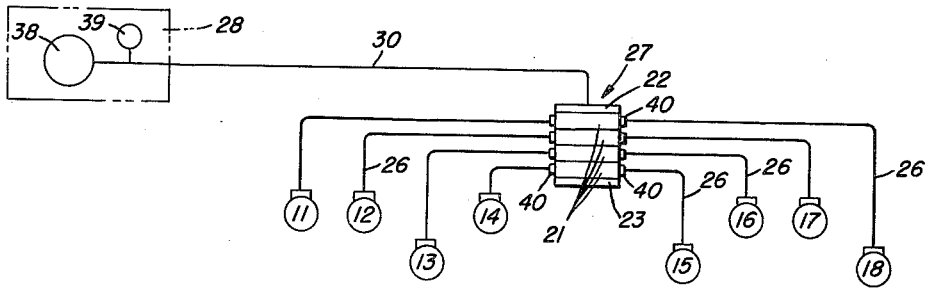
FIGURE 1 is a diagrammatic view of a lubricating system embodying the invention.

The lubricating system illustrated in FIGURE 1 supplies lubricant to several stations 11–18 and proportions the supplied lubricant between the several stations from a supply means 28 which may itself include a pump 38 actuated by a pressure-responsive switch 39 or the like which may trigger automatic shutting down of the lubricating system or may merely call for manual shutting down of the system or for other results in the intended mode of operation thereof.

The supply source supplies a lubricant to the system against varying back pressure so long as the back pressure does not exceed a maximum. The maximum may be defined merely by the inherent limitations of the supply source which may simply fail or stop when the intended pressure is exceeded, although this is rather rudimentary from an operational standpoint and would frequently be avoided. The pump may be actuated by any suitable non-electrical means or even manually if desired.

The supply means 28 communicates through a supply line 30 with the main inlet of a cycling distributor 27. The cycling distributor is located at the juncture of the supply line with a plurality of branch lines 26. The branch lines 26 lead from such juncture in downstream relationship to the supply line 30 and communicate with the several stations 11–18. The branch lines are fed from the outlets of the distributor 27. The distributor may comprise, for example, a plurality of valve blocks or units 21 and cap blocks 22 and 23, such cycling distributor having the interior structure described in U.S. Patent 2,792,911 or having the structure of other distributors of the cyclic type such as those previously mentioned. The several blocks 21 together with the cap blocks 22 and 23 may be assembled in side-by-side position by securing means such as long bolts or the like extending therethrough (not shown) and it will be understood that a plurality of valve blocks 21 may be used without any inherent top limit on the number of such valve blocks. It is not uncommon to employ scores of valve blocks.

Figure 3A:
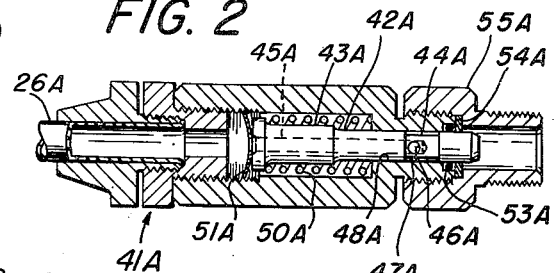
FIGURE 3A is a view in cross-section showing a back-pressure imposing means which may be employed in place of the back-pressure imposing means illustrated in FIG- URE 3 according to one preferred aspect of the invention.
Figure 3:
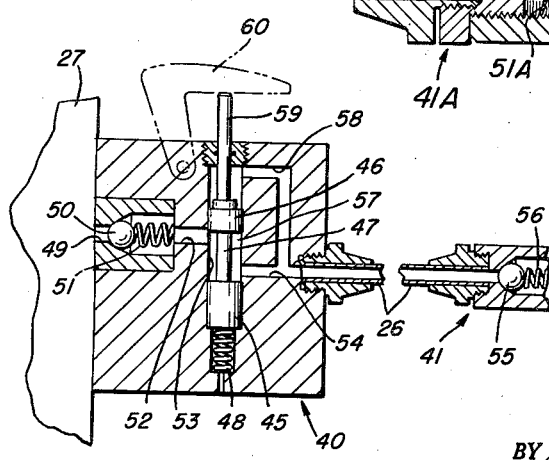
FIGURE 3 is a view showing in schematic cross-section the components associated with one of the branch lines of the system illustrated in FIGURE 1.
Figure 4:
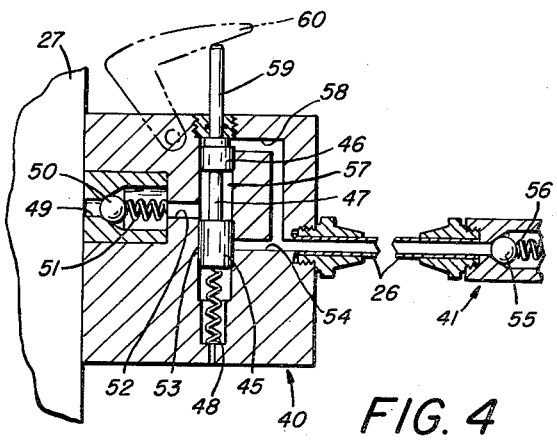
FIGURE 4 is a view similar to FIGURE 3 showing an alternate condition of the parts.

Provided at the outlets in the valve blocks 21 are a number of pressure-responsive devices generally indicated by the reference numeral 40 and shown in detail in FIGURES 3 and 4. The above referred to valve block outlets will be understood to be equivalent to the "main outlets" 33, 34, 39, 40, 45 and 46 in U.S. Patent 2,792,911; to "outlets" 33, 34, 37 and 38 in U.S. Patent 2,718,281; to "passages" 4a–4h in U.S. Patent 2,834,433; and to "discharge ports" 31–34 in U.S. Patent Re. 21,236.

Provided on-stream and immediately before the several stations 11–18 which comprise bearings or the like are means for normally imposing a minimum back pressure in the several branch lines 26, such means constituting in the illustrated example the pressure relief valves 41 of the ball check type which are illustrated in FIGURES 3 and 4 as part of the branch line assemblies.

It should be understood that the outlet branch lines 26 and the other conduits in the system may be of different sizes. Also the valve blocks 21 may have cylinders and pistons of the same size or of different sizes; that is, they may have piston chambers of identical volumes to supply equal measures of lubricant to the several stations or they may have chambers of different volumes to supply different quantities of lubricant to the several stations during each cycle of the distributor 27.

Each pressure-responsive device 40 may comprise a sliding balanced valving member having two lobes or pistons 45 and 46 joined by a stem 47 and urged upwardly as seen in FIGURES 3 and 4 by a spring 48. Leading from the associated outlet of the distributor 27 is a passage 49 in which is positioned a ball check 50 which is spring-loaded by a spring 51. Downstream of the ball check 50 a passage 52 intersects the bore 53 in which the balanced pistons 45 and 46 slide. Leading from the bore 53 is a passage 54 which communicates with the outlet branch line 26 and eventually with the check valve 41 which includes a ball check 55 and a spring 56. The line 26 is interrupted in FIGURES 3 and 4 to suggest the typical circumstance of a greater distance than can be shown in these figures between the pressure-responsive components 40 and the lubricated stations 11–18 immediately before which are located the check valves 41.

The pistons 45 and 46 and the stem 47 define together with the bore 53 a chamber 57 through which communicate the passages 52 and 54. A passage 58 leads from the passage 54 to a location in the bore 53 on the opposite side of the piston 46 from the passage 52. Fixed for movement with the stem or shaft 47 is a telltale stem 59 which may serve to raise a flag or indicator 60 pivoted on the body of the unit 40.

When the parts are in the position shown in FIGURE 3, flow into the passage 49 continues past the ball check 50 and then through the passage 52, chamber 57, passage 54, branch line 26, and check valve 41 to the associated one of the stations 11–18.

The opposed faces of the pistons 45 and 46 balance the fluid pressure within the chamber 57 to exert a net force of zero on the piston assembly. However, back pressure within the branch line 26 established by the force of the spring 56 is reflected on the outer face of the piston 46 to which such pressure is applied through the passage 58. This pressure holds the shaft 47 downwardly against the force of the spring 48 so long as the pressure is sufficient to overcome the force of the spring 48.

If the line 26 is ruptured as indicated in FIGURE 4 or if it is inadvertently disconnected or otherwise opened, the pressure against the outer face of the piston 46 drops and the spring 48 forces the shaft 47 upwardly as indicated in FIGURE 4 sealing off the passage 54 and therefore blocking incoming flow through the passage 49, ball check 50, and passage 52. The intersection of the passage 52 with the bore 53 will thus be seen to comprise a closable port. It will also be seen that when such port is closed by the piston or plunger assembly, the active face of the piston (which in this case is the outer face, the effective area of which is equal to the cross-sectional area of the bore 53 minus the cross-sectional area of the stem 59) is cut off from such port.

Accordingly, it will be clear that trouble along the line 26 in any form, be it a block or rupture, will result in an apparent block at the incoming passage 49. Despite pressure gradients and compressibility of the fluid being distributed in the system, such a block at the passage 49 will sooner or later prevent the distributor 27 from cycling past the stage at which grease is discharged to the branch line 26 in question. This in turn will signal trouble by causing abnormally high back pressure to occur in the supply line 30 whereupon the pressure-responsive switch 39 will be actuated or other pressure-responsive means will become effective.

The back-pressure imposing means may comprise a pressure relief valve 41A of the type shown in FIGURE 3A. The valves 41A may replace the check valves 41 previously described.

The illustrated valve 41A includes a stem 42A having a spring guiding portion 43A and a reduced portion 44A. A central bore 45A extends from the enlarged head of the stem 42A to a point within the reduced portion 44A. Through a port 46A this bore 45A communicates with the annular chamber 47A defined between the reduced portion 44A of the stem and the housing bore 48A within which the stem slides.

The drawing illustrates the stem 42A in its fully closed position. It is urged to such fully closed position by a compression spring 50A and it is limited in its leftward movement by appropriate means, such as the "Truarc" nut or fastener 51A which may be of the type which is adapted to be rapidly pressed into the associated tapped bore without rotation of the fastener but which cannot be backed out therefrom without being rotated as by engagement of a tool in keying relationship in the central opening of the fastener.

An O-ring 53A of the linear type is provided at one end of the housing and is retained therein by a washer 54A through which the end of the stem 42A slides in mating relationship. The washer 54A is retained in position by the fitting 55A.

The described pressure relief valve is particularly advantageous in its ability to function successfully with a variety of fluids of different viscosities and other characteristics. It will successfully operate indefinitely even with the heavy greases of a type which tend to prevent check valves from properly seating so as to establish the desired back pressure, and it will at the same time satisfactorily establish back pressure where relatively nonviscous oils or the like are employed in the associated distributing system. Of particular advantage is the fact that the cut-off condition of the valve is not reached only at the limiting fully closed condition shown in FIGURE 3A but first occurs at a point short of such limiting end condition during the leftward travel of the stem 42A. Such point where cut-off first occurs is approximately the point where the stem shoulder at the right end of the annular chamber 47A passes through the O-ring 53A or, in the case of heavier greases, this point may effectively be the point not far from the fully open position of the valve when the above mentioned shoulder first closes off the central opening within the washer 54A. Such washer 54A is generally bypassed by the lighter hydraulic fluids but may effectively act as a seal for the heavier greases.

The fact that effective valve cut-off occurs short of the limiting end position shown in the drawings is of advantage because the valve thereby has a capacity to maintain back pressure at desired values in the event that there is a very slight fluid loss in the line 26A upstream of the valve 41A which slight fluid loss may be perfectly normal to the operation of the system and which may be, for example, merely the loss due to trivial leaks or seepages along the branch line 26A between cycles of fluid injection through the particular branch line. A check valve such as a ball check valve which positively seats at a limiting end position (so that fully closed condition is the only cut-off condition) may be incapable of maintaining back pressure in the event of such trivial leakage. However the valve 41A has the capacity to maintain back pressure in such circumstances by displacement of the stem 42A leftwardly under the urging of the spring 50A in response to slight drops in pressure to thereby perform an accumulator function and to reestablish or maintain pressure within the line 41A at values which will usually be reduced only slightly and by amounts governed by obvious parameters such as the spring rate of the spring 50A. Abortive operation of the associated pressure responsive blocking means 40 is thereby precluded.

Immediately at the conclusion of each pulse of fluid injection through the branch line 26A and through the valve 41A to the lubricant site, the stem 42A will travel to the left under the urging of the compression spring 50A from open condition to a point where cut-off first occurs which for most fluids will be the point where the stem shoulder at the right end of the annular chamber 47A passes through the O-ring 53A.

At this point, assuming no leaks or seepages in the branch line 26A and further assuming the lubricating fluid is infinitely incompressible and the lines are infinitely rigid, leftward motion of the stem 42A toward the fully closed position (shown in FIGURE 3A) will cease.

Assume instead that there are very slight leaks or seepages in the line 26A between cycles of fluid injection. The pressure in line 26A will begin to fall off following initial occurrence of cut-off. If the stem 42A were restricted against further leftward movement following cut-off, nothing would prevent the pressure in line 26A from dropping almost immediately to zero whereby abortive operation of the pressure-responsive blocking means 40 would occur. However in the illustrated structure, the stem 42A is capable of moving leftward beyond initial cut-off position under the urging of the compression spring 50A to thereby maintain pressure within the line 26A at a level which descends only according to parameters such as the spring rate of the spring 50A, thereby maintaining considerable pressure within the line 26A until the succeeding fluid injection pulse and thus avoiding abortive operation of the pressure-responsive blocking means 40.

Figure 2:
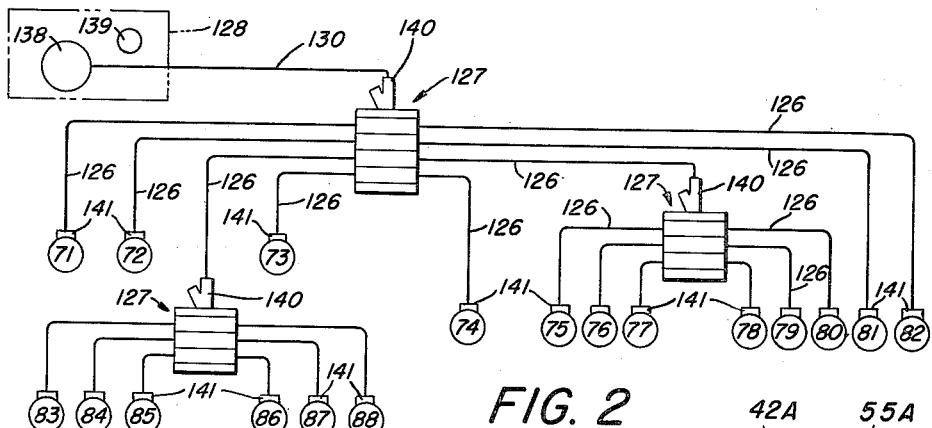
FIGURE 2 is a diagrammatic view of another lubricating system embodying the invention.

The lubricating system illustrated in FIGURE 2 supplies lubricant to several stations 71–88 and proportions the supplied lubricant between the several stations from a supply means 128 which may itself include a pump 138 actuated by a pressure-responsive switch 139 or the like which may trigger automatic shutting down of the lubricating system or may merely call for manual shutting down of the system in the intended mode of operation thereof.

Again, as in the case of previously described apparatus, the supply source supplies a lubricant to the system against varying back pressure so long as the back pressure does not exceed a maximum.

The supply means 128 communicates through a supply line 130 with the main inlet of a cycling distributor 127 through a pressure-responsive device 140. There are provided branch lines 126 leading from the distributor 127 and communicating (either directly, or indirectly through subsidiary pressure-responsive devices 140 and cycling distributors 127) with the several stations 71–88. Each distributor 127 may comprise, for example, a plurality of any of the several structures mentioned above in connection with the distributor 27. The principal distributor 127 is obviously located at the juncture of the supply line 130 and the branch lines 126 which lead directly to one of the stations 71–88 or which function as supply lines for the several sub-systems. Each subsidiary distributor 127 is obviously located at the juncture of the line 126 which supplies it with fluid and the lines 126 which it in turn feeds.

The distributors' main inlets to which the pressure-responsive devices 140 bear an on-stream relationship will be understood to be equivalent to the "main inlet 30" in U.S. Patent 2,792,911; to "inlet 31" in U.S. Patent 2,718,281; to "supply line passage 3" in U.S. Patent 2,834,433; and to "inlet port 5" in U.S. Patent Re. 21,236.

Provided on-stream and immediately before the several stations 71–88 which comprise bearings or the like are means for normally imposing a minimum back pressure in the several branch lines 126 directly communicating therewith, such means constituting in the illustrated example the check valves 141 which are indicated in FIGURE 2 and are similar or identical to the check valves 41 of FIGURES 1, 3 and 4. Check valves which form part of the stationary pressure-responsive devices 140 and to be described below normally impose minimum back pressure in the two lines 126 which feed the two subsidiary distributors 127.

Again, as in the previously described apparatus, the outlet branch lines 126 and the other conduits in the system may be of different sizes. Also the valve blocks of the distributors 127 may have cylinders and pistons of the same size or of different sizes, that is, they may have piston chambers of identical volumes to supply equal measures of lubricant to the several stations or they may have chambers of different volumes to supply different quantities of lubricant to the several stations during each cycle of the distributors.

Figure 5:
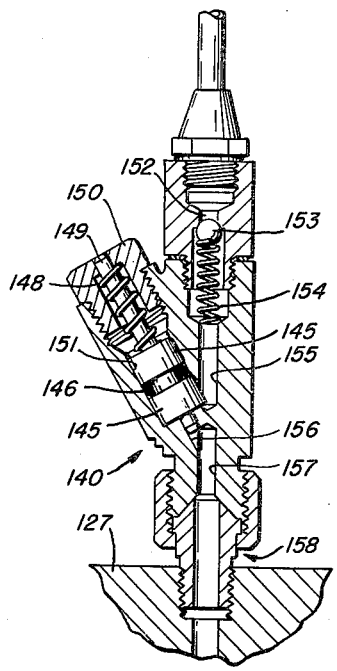
FIGURE 5 is a view showing in detailed cross-section certain components associated with the system illustrated in FIGURE 2.

Each pressure-responsive device 140 may comprise a sliding valving member comprising a lobe or piston 145 having a groove upon which to receive an O-ring 146. The piston 145 is urged to the left or seated position as illustrated in FIGURE 5 by a spring 148. A telltale stem 149 is fixed to the outer end of the piston 145 and is adapted to extend through a mating hole in a retaining cap 150.

The bore 151 receives the piston 145 in sliding sealing relationship. Leading from the supply line 130 or from one of the lines 126 which feed the two subsidiary distributors 127 is a passage 152 in which is positioned a ball check 153 which is spring-loaded by a spring 154. Downstream of the ball check 153, a passage 155 intersects the bore 151. Leading from the inner end of the bore 151 is a passage 156 which intersects an input passage 157 leading directly to the main inlets of the associated distributor 127 as by means of a coupling connection generally indicated by the reference numeral 158.

Figure 6:
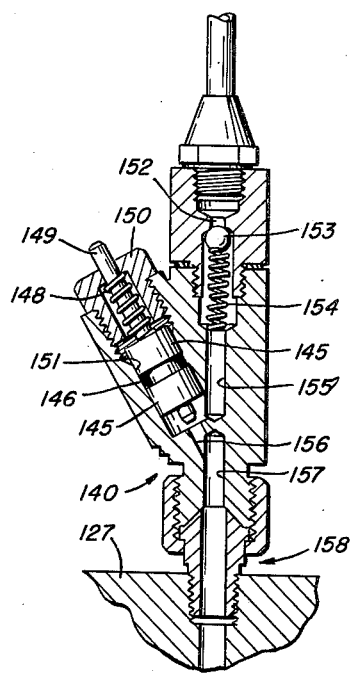
FIGURE 6 is a view similar to FIGURE 5 showing an alternate condition of the parts.

It will be apparent that in the position illustrated in FIGURE 5, the piston 145 is adapted to block the outlet end of the passage 155 and in the position shown in FIGURE 6, the outlet end of the passage 155 is open for supplying fluid to the inlet of the associated distributor 127.

When the parts are in the position shown in FIGURE 6, flow into the passage 152 continues past the ball check 153 and then through the passage 155, bore 151, passages 156 and 157, main inlet of the associated distributor 127, and then through the several branch lines 126 to subsidiary distributors or to one of the stations 71–88. Back pressure established by the force of the springs in the check valves 141 or, in the case of the branch lines 126 supplying the subsidiary distributors 127, by the force of the springs 154 of the ball checks at the input ends of the pressure-responsive means 140 is imposed on the innermost face of the piston 145 to maintain each pressure-responsive device 140 in the open position indicated in FIGURE 6, such imposed back pressure at the piston 145 being sufficient to overcome the force of the associated spring 148.

If a downstream line 126 is ruptured or if it is inadvertently disconnected or otherwise opened, the pressure against the outer face of the piston 145 drops and the spring 148 forces the piston to the position indicated in FIGURE 5 sealing off the associated passage 155 and therefore blocking incoming flow through the associated passage 152, ball check 153 and passage 155. The intersection of the passage 155 with the bore 151 will thus be seen to comprise a closable port. It will also be seen that when such port is closed by the piston or plunger assembly, a major portion of the active face of the piston (which in this case is the inner face, the total effective area of which is equal to the cross-sectional area of the bore 151) is cut off from such port. Such a block will cause a build up of pressure upstream in the system and will finally result in a trouble indication as at the pressure-responsive switch 139.

The pressure-responsive devices 140 described in connection with the apparatus of FIGURES 2, 5 and 6 are self-resetting in the sense that pressure above the trouble indicating pressure level may be applied from the pressure supply means 128 after a leak or block has been corrected or after pressure has fallen off as during a weekend shutdown or merely after trouble has been indicated by a trouble signal light or the like which lights or is otherwise activated in response to momentary pulses of pressure to levels above the trouble indicating pressure. Such abnormally high resetting pressure will be sufficient to act on the relatively small exposed area of the inner face of the piston 145 to overcome the force of the spring 148 and initiate movement of the piston 145 from the position shown in FIGURE 5 to the position shown in FIGURE 6. As soon as such movement is initiated, the entire area of the inner face of the piston 145 becomes exposed to system pressure and thereafter only the relatively low pressure which is normally imposed by the downstream back-pressure imposing means is required to maintain the piston 145 in open condition. The abnormally high resetting pressure is then discontinued.

Thus it will be understood that in the apparatus of FIGURES 2, 5 and 6 as well as in the previously described apparatus, each of the branch lines has means downstream thereof for imposing a back pressure (which means in connection with the branch lines supplying subsidiary distributors may comprise the input-end check valves of each pressure-responsive device 140). It will also be understood that there is means upstream with respect to each branch line 126 for continuously maintaining each branch line open to incoming flow only so long as such back pressure is imposed, whereby either leakage or blockage in any branch line will signal trouble by causing a pressure to build up in the upstream portions of the system.

The apparatus illustrated in FIGURES 2, 5 and 6 is appropriate for for many applications. In circumstances where cycling of the distributors is relatively rapid, it may be preferable to employ a system of the general type illustrated in FIGURES 1, 3 and 4.

It is within the contemplation of the invention to advantageously employ inlet checks in the distributors 27 or 127. Such provision of inlet checks may be as disclosed in application Serial No. 822,611, filed June 24, 1959, by Norman S. Robson, the disclosure of which is hereby adopted for purposes of the present disclosure, with particular reference to the "one-way flow imposing means 30" and the spring-loaded "ball 93" disclosed in said Robson application.

In the usage of the following claims, if a pressure-responsive blocking means is recited as "upstream" of a branch line, the relationship between the blocking means and the branch line is such that any fluid which reaches the branch line must first pass the blocking means. If a blocking means is recited as "on-stream" with respect to a branch line, the relationship between the blocking means and the branch line is such that any fluid which enters the system and flows through one of the two (the blocking means or branch line) and then leaves the system must necessarily, between its entry and exit from the system, flow through the other of the two. The "on-stream" relationship is satisfied if, as to only one of the two (the blocking means or branch line), it is the case that flow therethrough necessarily determines that there will be flow through the remaining one of the two.

It is within the contemplation of certain aspects of the invention to employ pressure-responsive blocking means or devices such as the devices 40 or 140 upstream of less than all branch lines. Thus for example one or more of the devices 40 may be eliminated from the apparatus of FIGURE 1. Supposing, by way of illustration, that in the apparatus of FIGURE 1 the devices 40 are eliminated from all the branch lines except the one leading to the bearing 15, it will still be the case that either leakage or blockage in the particular branch line leading to the bearing 15 will signal trouble by causing a pressure to build up in the upstream portions of the system. However, leakage in the other branch lines will not cause a pressure to build up in the upstream portions of the system to thereby signal trouble, although blockage in the other branch lines will cause such a build up and signalling of trouble. Obviously, the further modification may be made of substituting a device 140 for the device 40 in the branch line leading to the bearing 15.

Such arrangements where a pressure-responsive blocking means, such as a device 40 or 140, is located upstream of only one or a few of the branch lines may be useful in applications where most of the branch lines may be readily inspected for leaks but where one or a few branch lines may be in locations where it is difficult or impossible to visually inspect for leaks.

The above description of the invention should make it apparent that many details of the apparatus embodying the invention may be varied without departing from the teaching of the invention. Accordingly, the scope of the invention is not to be limited to precise details of the specifically described embodiments but is to be defined by the following claims.

For the purposes of the following claims, branch lines (such as the branch lines 126) which supply subsidiary distributors (such as the distributors 127) may be regarded as the supply line of the sub-system comprising each such branch line and all the components downstream thereof.

This application is a continuing application with respect to my copending application Serial No. 16,286, filed March 21, 1960, now abandoned.

What is claimed is:

1. A fluid distributing system capable of signaling within the fluid system itself the occurrence of either blocks or leaks in its branch lines comprising supply means for supplying fluid under pressure, a supply line leading from said supply means to a juncture and a plurality of branch lines leading from said juncture in downstream relationship to said supply line, means downstream in each of said branch lines for imposing a back pressure therethrough, pressure-responsive blocking means upstream of said branch lines and on-stream with respect thereto for containing said imposed back pressure and for maintaining a non-blocking relationship to fluid flowing in the downstream direction therethrough only so long as said back pressure is imposed, and a cyclical distributor at said juncture of said supply line and said downstream branch lines and operatively interposed between said supply line and each of said downstream branch lines, whereby blockage in any of said branch lines blocks the cycling of said cyclical distributor means and relief of said imposed back pressure as by leakage in one of said branch lines actuates said pressure-responsive blocking means so that either kind of trouble is signaled by build up of back pressure in said supply line resulting from effective blocking of the system downstream thereof.

2. A fluid distributing system capable of signaling within the fluid system itself the occurrence of either blocks or leaks in its branch lines comprising supply means for supplying fluid under pressure, a supply line leading from said supply means to a juncture and a plurality of branch lines leading from said juncture in downstream relationship to said supply line, means downstream in each of said branch lines for imposing a back pressure therethrough, pressure-responsive blocking means upstream of said branch lines and on-stream with respect thereto for containing said imposed back pressure and for maintaining a non-blocking relationship to fluid flowing in the downstream direction therethrough only so long as said back pressure is imposed said last-named means comprising a housing defining passageway means leading from an upstream inlet end of said passageway means through a one-way check valve and thence through a closable port and to an outlet end of said passageway means, pressure-responsive closing means adapted to move between a first position of blocking relationship with said port to a second position of non-blocking relationship with said port, spring means biasing said pressure-responsive closing means toward said first position, said pressure-responsive closing means having a displaceable face yieldably responsive to fluid pressure to move said pressure-responsive closing means toward said second position, said face being open to said closable port in said second position but at least a portion thereof being cut off from said closable port in said first position, and a cyclical distributor means at said juncture of said supply line and said downstream branch lines and operatively interposed between said supply line and each of said downstream branch lines, whereby blockage in any of said branch lines blocks the cycling of said cyclical distributor means and relief of said imposed back pressure as by leakage in one of said branch lines allows said spring means to move said pressure-responsive closing means to said first position to block off said closable port so that either kind of trouble is signaled by build up of back pressure in said supply line resulting from effective blocking of the system downstream thereof.

3. A fluid distributing system capable of signaling within the fluid system itself the occurrence of either blocks or leaks in its branch lines comprising supply means for supplying fluid under pressure, a supply line leading from said supply means to a juncture and a plurality of branch lines leading from said juncture in downstream relationship to said supply line, means downstream in each of said branch lines for imposing a back pressure therethrough, pressure-responsive blocking means upstream of said branch lines and on-stream with respect thereto for containing said imposed back pressure and for maintaining a non-blocking relationship to fluid flowing in the downstream direction therethrough only so long as said back pressure is imposed, said last-named means comprising a housing defining a bore and a fluid outlet leading therefrom and from said housing, passageway means leading from an upstream inlet end of said passageway means through a one-way check valve and thence to an intersection with said bore to define a port, a plunger slidable in said bore in fluid-sealing engagement with the walls thereof and movable between a first position of blocking relationship with said port and a second position of non-blocking relationship with said port, spring means biasing said plunger toward said first position, said plunger having a displaceable face yieldably responsive to fluid pressure to move said plunger toward said second position, said face being open to said port in said second position but at least a portion thereof being cut off from said port in said first position, and a cyclical distributor means at said juncture of said supply line and said downstream branch lines and operatively interposed between said supply line and each of said downstream branch lines, whereby blockage in any of said branch lines blocks the cycling of said cyclical distributor means and relief of said imposed back pressure as by leakage in one of said branch lines allows said spring means to move said pressure-responsive closing means to said first position to block off said closable port, so that either kind of trouble is signaled by build up of back pressure in said supply line resulting from effective blocking of the system downstream thereof.

4. A fluid distributing means as defined in claim 1 in which said means for imposing back pressure in said branch lines comprises a pressure relief valve including a valve housing and a valving stem movable within said housing from a valve-open position to a full-closed position, spring means urging said stem to said full-closed position, said stem being displaceable by incoming fluid in the branch line associated therewith toward said valve-open position against the biasing of said spring means, said stem and housing maintaining a cut-off condition throughout a range of said stem movement toward and unto said full-closed position whereby said pressure relief valve performs an accumulator function and precludes abortive operation of said pressure-responsive blocking means.

5. A fluid distributing system capable of signaling within the fluid system itself the occurrence of either blocks or leaks in its branch lines comprising supply means for supplying fluid under pressure, a supply line leading from said supply means to a juncture and a plurality of branch lines leading from said juncture in downstream relationship to said supply line, means downstream in at least one of said branch lines for imposing a back pressure therethrough, pressure-responsive blocking means upstream of said at least one branch line and on-stream with respect thereto for containing said imposed back pressure and for maintaining a non-blocking relationship to fluid flowing in the downstream direction therethrough only so long as said back pressure is imposed, and a cyclical distributor at said juncture of said supply line and said downstream branch lines and operatively interposed between said supply line and each of said downstream branch lines, whereby blockage in any of said branch lines blocks the cycling of said cyclical distributor means and relief of said imposed back pressure as by leakage in said at least one branch line actuates said pressure-responsive blocking means so that either kind of trouble is signaled by build up of back pressure in said supply line resulting from effective blocking of the system downstream thereof.

6. A fluid distributing system capable of signaling within the fluid system itself the occurrence of either blocks or leaks in its branch lines comprising supply means for supplying fluid under pressure, a supply line leading from said supply means to a juncture and a plurality of branch lines leading from said juncture in downstream relationship to said supply line, means downstream in at least one of said branch lines for imposing a back pressure therethrough, pressure-responsive blocking means upstream of said at least one branch line and on-stream with respect thereto for containing said imposed back pressure and for maintaining a non-blocking relationship to fluid flowing in the downstream direction therethrough only so long as said back pressure is imposed, said last-named means comprising a housing defining passageway means leading from an upstream inlet end through a one-way check valve and thence through a closable port and to an outlet, pressure-responsive closing means adapted to move between a first position of blocking relationship with said port to a second position of non-blocking relationship with said port, spring means biasing said pressure-responsive closing means toward said first position, said pressure-responsive closing means having a displaceable face yieldably responsive to fluid pressure to move said pressure-responsive closing means toward said second position, said face being open to said closable port in said second position but at least a portion thereof being cut off from said closable port in said first position, and a cyclical distributor means at said juncture of said supply line and said downstream branch lines and operatively interposed between said supply line and each of said downstream branch lines, whereby blockage in any of said branch lines blocks the cycling of said cyclical distributor means and relief of said imposed back pressure as by leakage in said at least one branch line allows said spring means to move said pressure-responsive closing means to said first position to block off said closable port so that either kind of trouble is signaled by build up of back pressure in said supply line resulting from effective blocking of the system downstream thereof.

7. A fluid distributing system capable of signaling within the fluid system itself the occurrance of either blocks or leaks in its branch lines comprising supply means for supplying fluid under pressure, a supply line leading from said supply means to a juncture and a plurality of branch lines leading from said juncture in downstream relationship to said supply line, means downstream in at least one of said branch lines for imposing a back pressure therethrough, pressure-responsive blocking means upstream of said at least one branch line and on-stream with respect thereto for containing said imposed back pressure and for maintaining a non-blocking relationship to fluid flowing in the downstream direction therethrough only so long as said back pressure is imposed, said last-named means comprising a housing defining a bore and a fluid outlet leading therefrom, passageway means leading from an upstream inlet end through a one-way check valve and thence to an intersection with said bore to define a port, a plunger slidable in said bore in fluid-sealing engagement with the walls thereof and movable between a first position of blocking relationship with said port and a second position of non-blocking relationship with said port, spring means biasing said plunger toward said first position, said plunger having a displaceable face yieldably responsive to fluid pressure to move said plunger toward said second position, said face being open to said port in said second position but at least a portion thereof being cut off from said port in said first position, and a cyclical distributor means at said juncture of said supply line and said downstream branch lines and operatively interposed between said supply line and each of said downstream branch lines, whereby blockage in any of said branch lines blocks the cycling of said cyclical distributor means and relief of said imposed back pressure as by leakage in said at least one branch line allows said spring means to move said pressure-responsive closing means to said first position to block off said closable port, so that either kind of trouble is signaled by build up of back pressure in said supply line resulting from effective blocking of the system downstream thereof.

8. A fluid distributing means as defined in claim 5 in which said means for imposing back pressure in said branch lines comprises a pressure relief valve including a valve housing and a valving stem movable within said housing from a valve-open position to a full-closed position, spring means urging said stem to said full-closed position, said stem being displaceable by incoming fluid in the branch line associated therewith toward said valve-open position against the biasing of said spring means, said stem and housing maintaining a cut-off condition throughout a range of said stem movement toward and unto said full-closed position whereby said pressure relief valve performs an accumulator function and precludes abortive operation of said pressure-responsive blocking means.

References Cited in the file of this patent

UNITED STATES PATENTS 1,942,180  Martin _____ Jan. 2, 1934